United States Patent [19]

Bricker et al.

[11] Patent Number: 5,041,151
[45] Date of Patent: Aug. 20, 1991

[54] METHOD AND APPARATUS FOR GLASS EDGE FINISHING

[75] Inventors: Jack A. Bricker, Tarentum; Earl L. May, Irwin, both of Pa.

[73] Assignee: PPG Industries, Inc., Pittsburgh, Pa.

[21] Appl. No.: 590,706

[22] Filed: Oct. 1, 1990

[51] Int. Cl.[5] .............................................. C03B 29/00
[52] U.S. Cl. ......................................... 65/104; 65/120; 65/284
[58] Field of Search ................... 65/65, 104, 120, 252, 65/284

[56] References Cited

U.S. PATENT DOCUMENTS

| | | | |
|---|---|---|---|
| 2,883,797 | 4/1959 | Eldred | 49/7 |
| 2,971,294 | 2/1961 | Hohmann et al. | 49/77 |
| 3,008,270 | 11/1961 | Hohmann et al. | 49/58 |
| 3,107,161 | 10/1963 | Bivens et al. | 65/65 |
| 3,419,375 | 12/1968 | Meiresonne | 65/284 |
| 3,592,620 | 7/1971 | Carlisi et al. | 65/30 |
| 3,594,145 | 7/1971 | Kay | 65/284 |

Primary Examiner—Joye L. Woodard
Attorney, Agent, or Firm—Andrew C. Siminerio

[57] ABSTRACT

Flame seaming a glass sheet of irregular outline using a ring-type burner having an apertured inner wall aligned with the central portion of the glass sheet edge develops an edge of more uniform appearance when the application of a fuel mixture to a portion of said apertured wall facing the glass edge is different for curved portions of the wall facing curved portions of the glass sheet outline than to straight line portions of the wall facing straight portions of the glass sheet outline. Further reduction of non-uniformity of glass edge appearance may result from providing orbital motion between said glass sheet outline and an apertured inner wall of said ring-type burner.

30 Claims, 3 Drawing Sheets

METHOD AND APPARATUS FOR GLASS EDGE FINISHING

BACKGROUND OF THE INVENTION

1. Field of the Invention

This invention relates to a method and apparatus for treating glass sheet edges and particularly to the flame treatment of the peripheral edges of glass sheets.

2. Technical Problems and the Prior Art

Flat glass is cut to desired outline configurations by drawing a cutting tool over one major surface of the glass to score the surface along a line conforming to the outline configuration desired. The cut is then completed by applying pressure to the glass on opposite sides of the score line while supporting the glass sheet on its other major surface along a line directly below the score line. During scoring with a cutting tool, the surface that is initially breached often develops vents emanating from the score line. These vents are flaws in the scored surface such as hair lines, chips or other flaws that may open up to cause the glass to rupture, crack or shatter when subjected to subsequent heating and cooling required to bend and/or temper the glass.

It has been known for some time that it is important to remove the vents and treat the glass in such a manner that the peripheral edge of the glass is smooth and free of vents, particularly when the cut glass sheet is to be bent and tempered to form automobile back lights. Rough edges have been smoothed somewhat by sanding or otherwise abrading the rough cut edge. However, mechanical operations of this type are slow and, unless the edges are subjected to prolonged abrasion, vents remain that cause later rupture of the glass.

Flame seaming has been developed to strengthen either a straight edge or the entire perimeter of a glass sheet cut to an irregular outline. An open flame jet comprising a single elongated jet or a series of closely spaced jets impinges against an edge to be seamed. In case of a straight edge, the straight edge is moved linearly past an open flame jet comprising a series of closely spaced jets directed against the center of said straight edge so that each increment along said straight edge is subjected to successive impingement by all of said closely spaced jets. Tumblers having rounded peripheries have their peripheral rims fire finished either by exposure to an annular burner or by rotating said tumblers to pass each increment of the rim in close relation to a series of closely spaced burners mounted in an arcuate arrangement to heat each increment of the rim as the tumbler rotates while going from a loading station to an unloading station in an arcuate path past the arcuate arrangement of burners.

Glass sheets cut to irregular outlines have been flame seamed by supporting a glass sheet precut to irregular outline in fixed relation within a flame seaming apparatus spaced outwardly from said glass sheet outline and constructed and arranged to impinge an open flame jet against the edge to be seamed to simultaneously fire polish the complete edge of the sheet. The open flame jet originates either from a pipe having a plurality of closely spaced ports facing the entire edge of the glass sheet so that jets of burning gas combine to provide a continuous sheet of flame impinging against the glass sheet edge or from a pipe having a slot-type continuous orifice. While the purpose of this system is to provide a uniform heat flux to the entire edge of the glass sheet by directing a sheet of flame in a direction parallel to the major surfaces of the glass sheet to impinge against the center of the glass sheet edge, small variations in the burner flame front occur. As a result of these small variations, small irregularities develop in the regions of the fire polished edge that are subjected to deviations from uniformity of the impinging flame front. While translating a straight edge in a straight line direction relative to a straight source of burning gas compensates for irregularities in the fire polish finish of a straight edge and a relative rotational movement of a round edge surface relative to an accurately constructed burner compensates for irregularities in the fire polished finish of a rounded edge, neither of these techniques are suitable to improve the uniformity of the fire polished finish of a glass sheet having an irregular outline that includes both straight and curved portions.

U.S. Pat. Nos. 2,971,294 and 3,008,270 to Hohmann et al. teach a method and apparatus for flame seaming either the entire edge periphery or one straight edge only of a precut glass sheet of irregular outline. A flame seaming burner comprising a pipe member corresponding in shape to the outer irregular peripheral configuration of the piece of glass and having a series of apertures formed through its inner periphery is aligned with the glass sheet edge so that flame jets of a suitable gas and air mixture are directed against the center of the edge of the irregularly shaped glass sheet. Flame seaming is achieved in these patents when the flame burner apertures are No. 50 size drill holes arranged on ¼ inch centers with the mouths of the jets approximately 1 inch from the edge of the glass sheet to be treated. There is no relative motion between the glass sheet and the pipe member for a period of 10 to 15 seconds while the glass sheet is exposed to the burning gas jets. In the embodiment to flame seam a straight edge, the glass sheet is passed through a series of closely spaced flame jets applied to the straight edge. No solution is suggested to reduce any irregularity that may develop in the fire polished edge of a sheet of irregular outline. The second embodiment, which teaches relative linear motion of a straight glass sheet edge relative to a straight line series of flame jets, is not appropriate for any other shape of edge other than straight edge.

U.S. Pat. No. 3,592,620 to Carlisi et al. teaches introducing certain thermally decomposable compounds into a fire polishing flame applied to an edge of a glass laminate to cover an edge gap between layers that are adhered at the major surfaces of a glass sheet laminate, but leave an edge portion exposed to form said edge gap.

U.S Pat. No. 2,883,797 to Eldred and U.S. Pat. No. 3,107,161 to Bivens et al. relate to techniques for fire polishing the circular rims of glass tumblers. Eldred rotates the edge through a series of jets of burning gas arranged along an arcuate path to heat the rim in a uniform manner. Bivens et al. exposes the entire circular rim to a ring burner for a short duration of 1 to 2 seconds to fire finish the surface of the rim without materially causing an out-of-round condition in the rim. These last two patents are not capable of flame seaming a glass sheet having an outline configuration that is irregular rather than round.

BRIEF DESCRIPTION OF THIS INVENTION

This invention makes possible the flame seaming of flat glass sheets having an irregular outline to form flame seamed edges with smaller irregularities than those obtained using the technique of the Hohmann et al., patents described previously. This invention provides novel structural arrangement for the burner adjacent the apertured wall through which fuel gas is applied as a flame to the central portion of the glass sheet edge so as to equalize the intensity of the flame applied to different portions of the glass edge where the inner edge wall is straight and where the inner wall edge is curved by providing a slight difference in structure of the flame supply system in the straight and curved portions of the outline of an interior wall structure of the ring-type burner. The structural arrangement comprises varying the distance separating adjacent ports and/or the size of the port opening of a port-type burner along the straight and curved portions of an inner apertured wall of the burner, depending on the degree of curvature and its convexity or concavity. In the case where the burner is a slot-type burner, the width and/or height of a slot of uniform height is varied slightly along portions of the inner apertured wall having different degrees of curvature from a straight line portion of said inner wall.

A second aspect of this invention provides an orbital movement between the edge of a precut glass sheet or irregular outline and a ring-type burner having an edge facing opening of the slot type or a series of openings of the port type along an inner edge wall of irregular shape similar to but larger than the irregular outline of said glass sheet.

The benefits of this invention will be better understood in the light of a description of preferred embodiments that follow.

DESCRIPTION OF PREFERRED EMBODIMENTS

Figure 1:
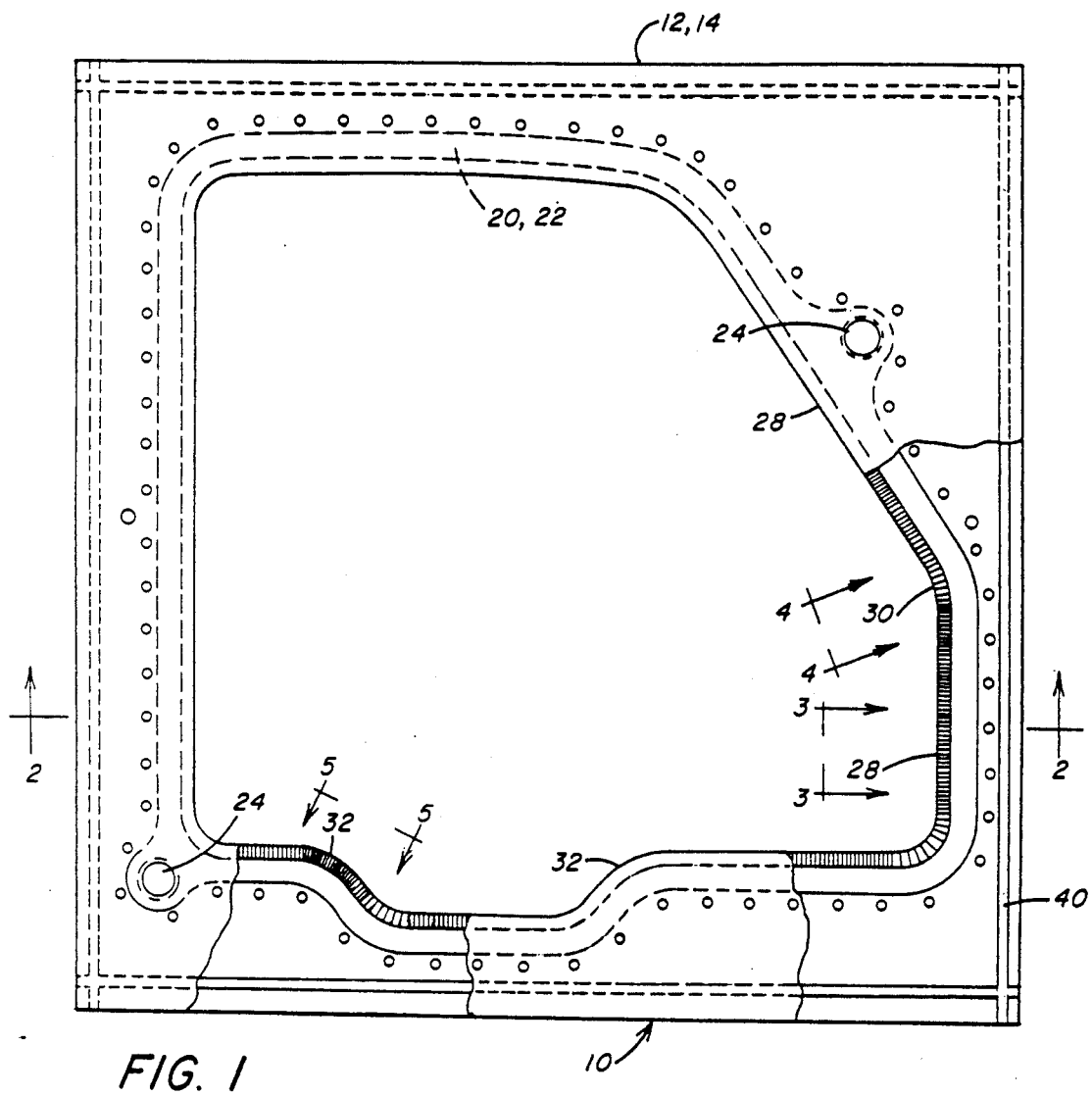
FIG. 1 is a plan view of a port-type ring burner forming one embodiment of this invention.
Figure 2:
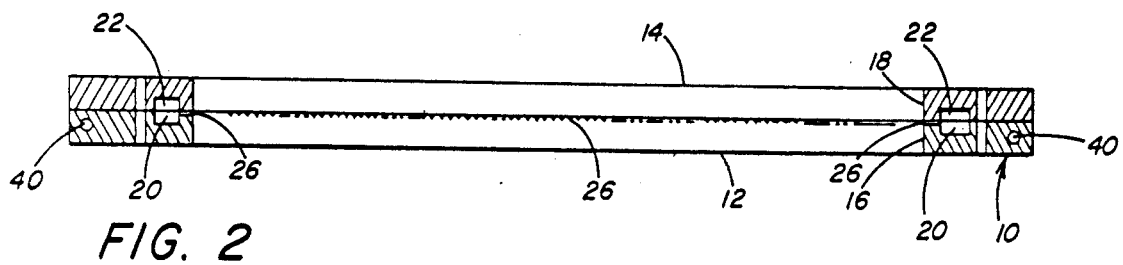
FIG. 2 is a cross-section taken along the line 2—2 of FIG. 1.

In the drawings, FIGS. 1 to 4 show how the principles of the present invention are applied in the construction of a port-type ring burner 10. Although these figures show the burner 10 to have a generally planar shape so as to flame seam the edge of a flat glass sheet, the teaching of this disclosure may also be applied to flame seaming a curved glass sheet. The burner 10 comprises a lower ring member 12 and an upper ring member 14, both preferably of aluminum and suitably connected to one another to form a frame of rectangular outline. Although not limiting in the present invention, in this particular embodiment, lower ring member 12 has an apertured inner wall 16 and upper ring member 14 has an imperforate inner wall 18 superimposed in alignment over inner wall 16 to provide an inner wall 16, 18 of irregular outline slightly larger than but corresponding to the irregular outline of a glass sheet to be flame seamed but spaced approximately ⅝ inch (1.59 cm) from the glass sheet perimeter edge when aligned properly therewith. In an illustrative embodiment, each ring member is 0.900 inch (2.29 cm) thick, but this dimension may be varied. An upwardly facing continuous channel 20 is provided along the upper surface of lower ring member 12 near inner wall 16 and a downwardly facing continuous channel 22 forming a mirror image of upwardly facing channel 20 is provided along the lower surface of upper ring member 14 near inner wall 18 to form a passage or closed internal continuous circumferential channel 20, 22 extending around burner 10 laterally outside of inner wall 16, 18. Although not limiting in the present invention, in the particular embodiment shown in FIG. 2, passage 20, 22 has a square cross-section 0.750 inch (1.91 cm) on each side. A pair of fuel inlet lines 24 extend through the thickness of lower ring member 12 to connect a source of gas mixed with oxygen and/or air (not shown) to continuous passage 20, 22.

Figure 3:
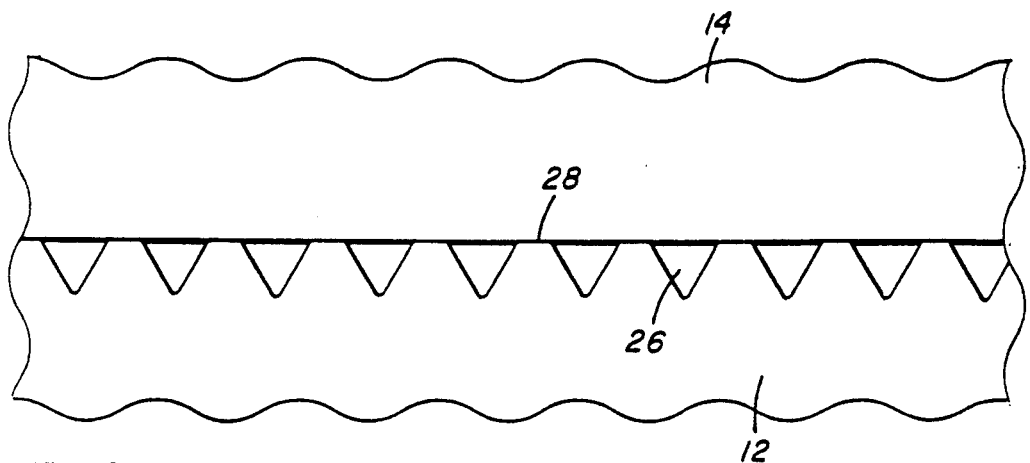
FIG. 3 is a view along line 3—3 of FIG. 1 of a series of ports along a straight line portion of an inner wall of the port-type ring burner shown in FIG. 1 that faces a straight line portion of a glass sheet having an irregular outline including a straight line portion.
Figure 4:
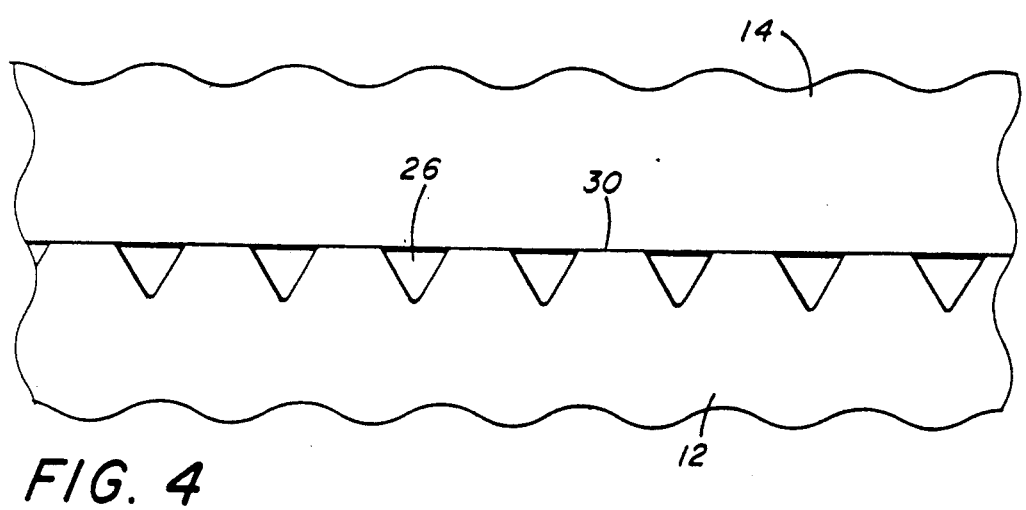
FIG. 4 is a view along line 4—4 of FIG. 1 of a series of ports along a concavely curved portion of the inner wall of the port-type ring burner shown in FIG. 1 that faces a convexly curved portion of a glass sheet of irregular outline.
Figure 5:
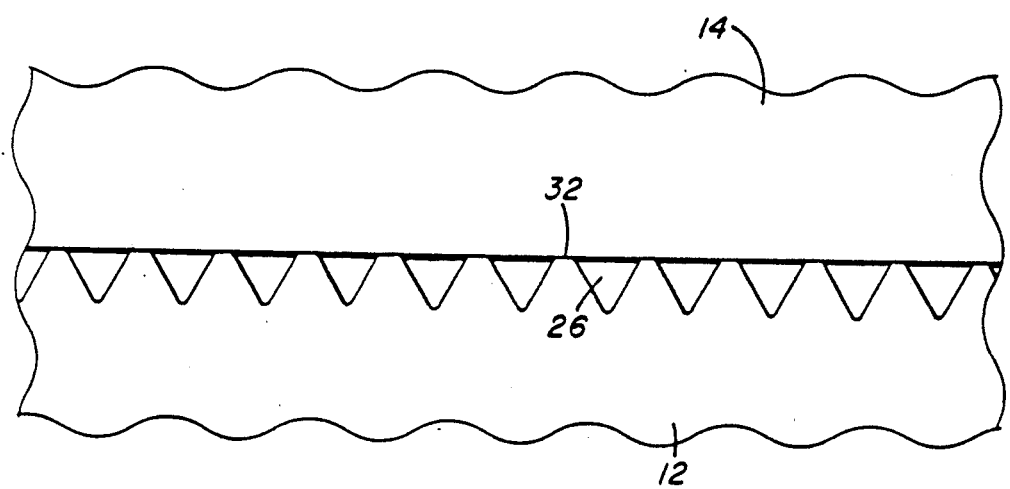
FIG. 5 is a view along line 5—5 of FIG. 1 of a series of ports along a convexly curved portion of the inner wall of the port-type ring burner shown in FIG. 1 that faces a concavely curved portion of a glass sheet of irregular outline.

Although not limiting in the present invention, inner wall 16 is notched downward along its upper surface from its inner edge to upwardly facing continuous channel 20 to form a series of ports 26 (see FIGS. 3 and 4). In the particular embodiment of the invention shown in FIGS. 3 and 4, the parts 24 are generally V-shaped in elevation although other port shapes may be used. More particularly, the ports 26 are essentially triangular in shape with a 60 degree angle between the walls of the ports. The apex of each port is rounded to a radius of 0.006 inches (0.15 mm). Each triangle forming a V-shaped port 26 has a vertical dimension of approximately 0.030 inches (0.76 mm) from the upper surface of lower ring member 12 to the rounded apex of the triangle. The ports 26 along a straight line portion 28 of inner wall 16 are spaced apart at 0.060 inch (0.15 cm) centers by way of example, as shown in FIG. 3, while those along a portion 30 of inner wall 16 that is concavely curved in plan are spaced more widely apart as shown in FIG. 4 and those along a portion 32 of inner wall 16 that is convexly curved in plan are spaced more closely together than the ports 24 facing straight line portion 28 as shown in FIG. 5. The actual port spacing along portions 30 and 32 depends on the severity of the curve along the walls 16, 18.

The ports 26 provide spaced passages along the length of the inner wall 16 of lower ring member 12 to permit passage of fuel gas to escape from closed continuous channel 20, 22 to inner wall 16. Ports 26 face an adjacent portion of a glass edge whose center of thickness is generally aligned with the line of ports 26 when the entire peripheral edge of the glass is flame seamed. Modifying the separation between adjacent ports 26 from their separation along straight line portion 28 of the inner wall 16 of lower ring member 12 for convexly or concavely curved portions of inner wall 16 as described previously tends to equalize the heat flux per unit length along the perimeter of a glass sheet of irregular outline. If the modification in spacing were not made to compensate for irregularities in outline shape of the inner wall 14, 16 of the ring-type port burner 10, the heat flux would be more intense in the portions of the glass sheet edge that face concavely curved portions of the inner wall and would be less intense in the portions of the glass sheet edge that face convexly curved portions of the inner wall.

Cooling passages 40 are provided in the lower ring member 12 and if desired, additional passages may be provided within upper ring member 14. Water or other coolant is supplied to control the temperature of ring burner 10 to insure that flames are limited to the space between inner wall 16, 18 and the edge of a glass sheet undergoing edge finishing. Based on the teachings in this disclosure, it would be obvious to one skilled in the art that the desired uniform heat flux could also be achieved by maintaining the port spacing but varying the opening size, i.e., cross section of the ports 26. More particularly, concavely curved portions 30 of the burner 10 would have ports 26 with a cross section less than the ports 26 in the straight line portions 28 of the burner 10 to reduce the heat flux and convexly curved portions 32 of the burner would have ports 26 with a cross section greater than the ports 26 in the straight line portion 28. Furthermore, the spacing and cross section of the ports 26 may both be varied to provide the desired uniform heat flux.

Figure 6:
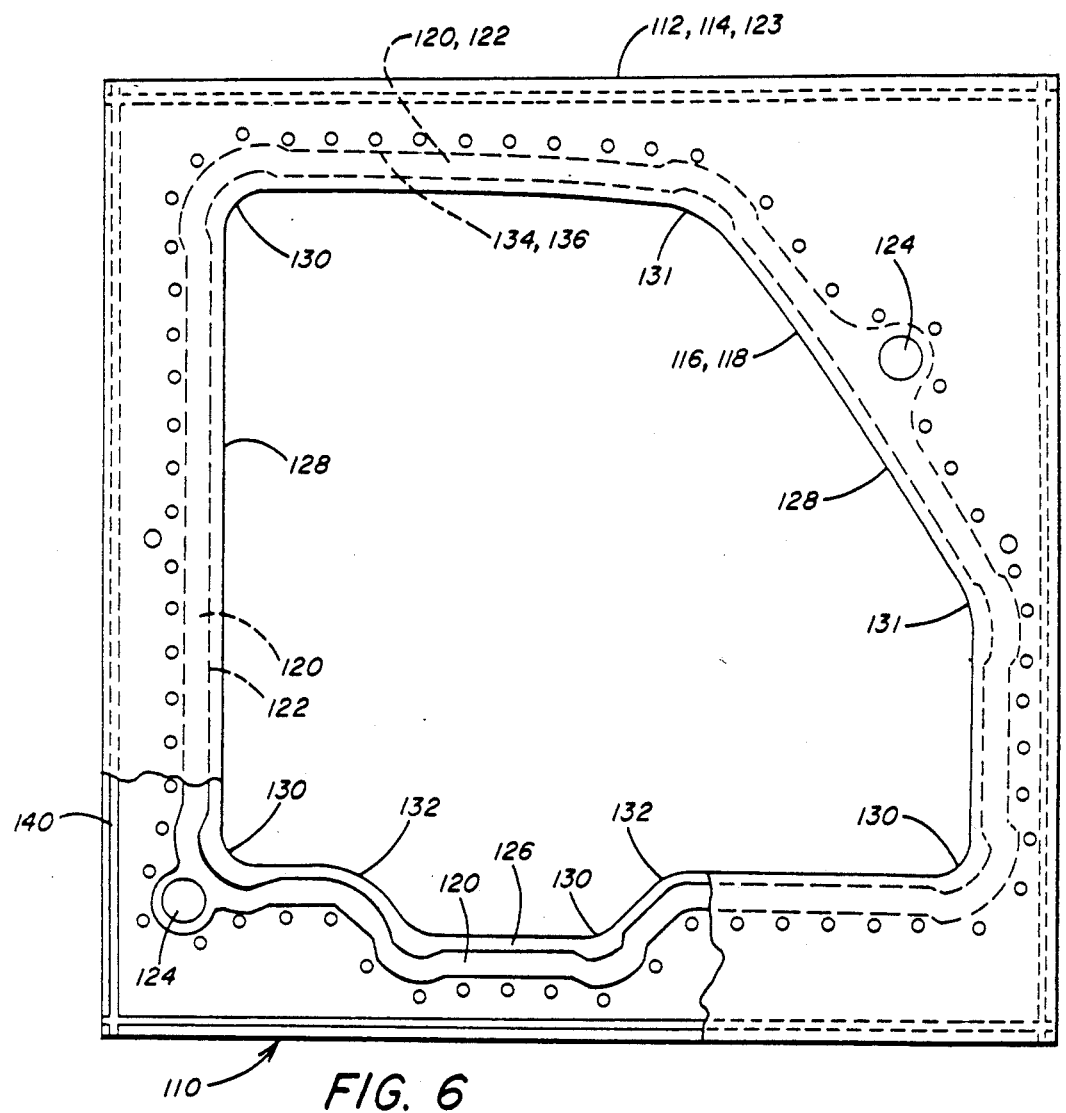
FIG. 6 is a plan view of a slot-type ring burner forming a second embodiment of this invention.
Figure 7:
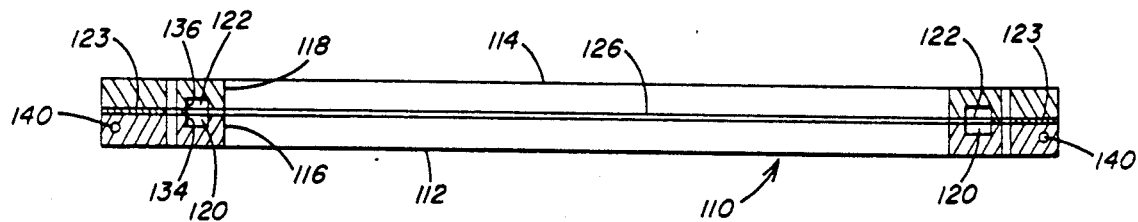
FIG. 7 is a cross-section taken along line 7—7 of FIG. 6.

In the embodiment of FIGS. 6 and 7, a slot-type ring burner 110 is illustrated comprising a lower ring member 112 and an upper ring member 114 having a rectangular outline. Lower ring member 112 has an inner wall 116 and upper ring member 114 has an inner wall 118 aligned over inner wall 116 and of the same general outline shape as inner wall 118. As in the first embodiment, the inner walls 116, 118 conform in shape but are spaced from the outline of a glass sheet by approximately ⅝ (1.59 cm) inch throughout the entire perimeter of the latter. Neither inner wall 116 nor 118 is notched in this embodiment. Lower ring member 112 has a continuous channel 120 of uniform depth and width that faces upward in alignment with a mirror-image continuous channel 122 of uniform depth and width that faces downward within upper ring member 114 to form a continuous channel 120, 122 extending around the burner 110. A shim 123 0.010 (0.15 mm) inches thick separates the bottom surface of upper ring member 114 from the upper surface of lower ring member 112 and extends around the outer perimeter of burner 110. The thickness of inner walls 116 and 118 differ along their length to space continuous channel 120, 122 different distances from the vertical inner wall 116, 118 along the length of the latter, depending on the local shape of the perimeter portion of the inner wall 116, 118. Shim 123 has an outer edge conforming to outline of burner 110 and an inner edge shaped to conform to the outline of vertical walls 134 and 136 of continuous channels 120, 122, respectively. Therefore, shim 123 defines with channels 120 and 122 a continuous fuel supply chamber having fuel inlet lines 124 similar to fuel inlet lines 24 of the first embodiment and a continuous slot opening 126 of uniform height around the entire inner perimeter of slot-type burner 110 instead of the spaced array of ports 26 of the first embodiment.

The height of the continuous slot opening 126 is, for example, 10 mils (0.25 mm), the thickness of shim 123. The distance to inner wall 116, 118 from channel 120, 122 within the inner edge of shim 123 ranges between 0.580 and 0.610 inch (1.47 to 1.55 cm) width along sharply concavely curved portions 130 of inner wall 116, 118; 0.440 to 0.450 (1.12 to 1.14 cm) inch width along less sharply concavely bent portions 131; and approximately 0.320 inch (0.81 cm) width along convexly curved portions 132, with an intermediate width of 0.375 (0.95 cm) inch along straight line portion 128 in the outline arrangement depicted in FIG. 6. With a constant height of 10 mils (0.25 mm) and varying escape path widths of 0.320 inch to 0.610 (0.81 to 1.55 cm) inch from the fuel gas supply channel 120, 122 to inner wall 116, 118, the cross-section of the burning gas available for emission through continuous slot 126 varies from increment to increment of slot length supplying fuel gas to different portions of the glass edge perimeter. The heat flux of burning gas supplied to each increment of glass edge can be made to substantially equal the heat flux of burning gas supplied to each other increment of glass edge by constructing and arranging the width of the escape path from the gas supply channel 120, 122 locally to inner wall 116, 118 along different increments of slot 126 in a special relation to the straightness, convexity or concavity of the outline shape of each inner wall portion depending on the local shape of the glass sheet portion it faces when the continuous slot has a uniform height.

According to this embodiment of the Invention, a slot-type burner having a continuous passage for the flow of fuel gas within its inner wall for dispensing said fuel gas through a continuous slot of uniform height through said inner wall requires the construction and arrangement of the width of said slot from said passage to an exposed inner surface of said apertured inner wall to provide different widths of escape paths for different portions of said slot-type burner of the ring type. For example, the slot is relatively wide to provide a greater width of escape path from the continuous passage adjacent where the inner wall is curved concavely in plan and relatively narrow to provide a lesser width of escape path from the continuous passage adjacent where the inner wall is curved convexly in plan compared to the width of escape path from said continuous passage adjacent where the inner wall defines an essentially straight line. Unless this feature is followed, the heat flux per unit length of glass edge is likely to be non-uniform which causes a non-uniform edge to result in the glass after flame seaming.

Attempts were made to grind one of the ring members 112 or 114 to develop a continuous slot of uniform height for the slot-type burner. However, the resulting slot was less uniform in width than slots developed by interposing a peripheral shim 123 between the upper and lower ring members 114 and 112, respectively. Attempts to machine a slot 0.010 (0.25 mm) wide resulted in continuous slots having a width that varied from 0.007 inch to 0.011 (0.18 to 0.28 mm) inch. No such variation from uniformity of slot width resulted from using a shim 0.010 (0.25 mm) inch thick to separate the burner members.

Based on the teachings in this disclosure, it would be obvious to one skilled in the art that the desired uniform heat flux could also be achieved by maintaining the slot 126 width but varying its height. More particularly, concavely curved portions 130 of the burner 110 would have a slot height less than the slot height along the straight line portion 128 of burner 110 to reduce the heat flux and convexly curved portion 132 of the burner 110 would have a slot height greater than the slot height along the straight line portion 128. Furthermore, the slot 126 height and width may both be varied to provide the desired uniform heat flux.

Both embodiments of ring-type burners were used to perform full perimeter fire polishing with a water cooled aluminum burner sized so as to provide approximately ⅝ (1.59 cm) inch space between the burner inner wall and the edge of the glass at all points of the perimeter. Burner cooling was accomplished by flowing water through a 5/16 (0.79 cm) inch diameter water passage 40 or 140 extending around a path adjacent the outside perimeter of the burner lower ring member 14 or 114 and parallel with the edges of the glass sheet supported within the inner wall of the burner at a rate of ¼ to ½ gallon per minute (0.95 to 1.89 liters per minute).

Glass sheets of soda-lime-silica float glass having approximately 80 inch (2.03 mm) perimeter and outline shapes corresponding to automotive parts were preheated to temperatures ranging between 1073° F. to 1120° F. (578° C. to 604° C.) for sheets 4 millimeters thick and subjected to a fire polish of 4 to 7 seconds with fuel supplied as a gas-oxygen mixture supplied at a flow rate of 650 to 820 cubic feet per hour (18.4 to 23.2 cubic meters per hour) including 180 to 230 cubic feet per hour (5.1 to 6.5 cubic meters per hour) of gas and 450 to 640 cubic feet per hour (12.7 to 18.1 cubic meters per hour) of oxygen.

The burners were mounted on a rectangular frame with replaceable chain driven cams at each of the four corners of the rectangle. Orbital motion was imparted to the frame to reduce the effects of any localized irregularity in flame front that caused a non-uniform edge and provide a more uniform heat flux around the glass perimeter. The orbit has a displacement preferably much less than the burner to glass edge spacing when said spacing is essentially An orbital displacement of about ⅛ inch (0.68 mm) provided some results that yielded acceptable edges for a burner to glass edge uniform spacing of ⅝ inch (1.59 cm). Displacements of 0.04 inch and 0.08 inch (0.10 cm and 0.20 cm) produced less improvement in results.

The frame was also provided with three graphite tips for glass support within the ring-type burners. The graphite tips were heated internally by enclosed cartridge heating elements to maintain glass contact temperature in the range of 800° F. to 950° F. (427° C. to 510° C.).

Other tests performed on iron containing glass samples available from PPG Industries, Inc. under the trademark SOLEX showed that a preheat temperature as low as 850° F. (454° C.) could be used for 4 mm thick glass sheets that were fire polished in 4 to 5 seconds using a fuel flow consisting essentially of 215 cubic feet per hour (6.1 cubic meters per hour) of gas and 530 cubic feet per hour (15.0 cubic meters per hour) of oxygen without breakage.

Conforming to the requirements of the patent statutes, applicants have described the principles of this invention together with elements presently considered to be the best embodiments thereof. However, it is understood that the disclosure is illustrative only and the invention may be modified within the scope of the claimed subject matter that follows without departing from the gist of this invention.

What is claimed is:

1. Apparatus for flame seaming a glass sheet of irregular outline including a relatively straight edge outline portion and a curved edge outline portion comprising: a ring-type burner having an aperture inner wall with straight and curved line portions corresponding to that of the irregular outline of said glass sheet and constructed and arranged to align said apertured inner wall in circumferentially spaced arrangement about said irregularly shaped outline of said glass sheet, means for delivering a fuel gas mixture through said apertured inner wall for producing a flame along the irregular outline of the glass sheet, and means for equalizing the heat flux per unit length delivered along said apertured wall.

2. The apparatus as in claim 1 wherein said fuel gas delivery means include an enclosed channel extending around and in communication with said apertured wall.

3. The apparatus as in claim 2 wherein said equalizing means includes portions of said enclosed channel and said apertured inner wall along the straight line portion of said apertured inner wall being constructed and arranged so as to deliver said fuel gas mixture at a given rate of flow per unit length of inner wall through said straight line wall portion and portions of said enclosed channel and said apertured inner wall along the curved line portion of said apertured inner wall being constructed and arranged slightly differently from said straight line portion so as to deliver said fuel gas mixture at a slightly different rate of flow per unit length through said curved line portion, the slight differences in flow rate per unit length being such as to have the fuel gas impinge on the curved edge portion of the glass edge with a more nearly equal rate of flow per unit length compared to that impinging on said straight edge portion of said glass edge than when the construction and arrangement of said different portions of said enclosed channel and said apertured wall are not different.

4. The apparatus as in claim 1 wherein said apertured inner wall includes a series of closely spaced ports extending through said inner wall to said channel and arranged along the length of said inner wall with a given spacing between adjacent ones of said ports along said straight line portion of said inner wall and a different spacing between adjacent ones of said ports arranged along the length of said curved line portion of said inner wall.

5. The apparatus as in claim 4 wherein said ports arranged along the length of said curved line portion have a spacing greater than said given spacing along any convexly curved line portion of said inner wall and have a spacing less than said given spacing along any concavely curved line portion of said inner wall.

6. The apparatus as in claim 5 wherein all of said ports have the same cross section.

7. The apparatus as in claim 3 wherein said apertured inner wall includes a series of closely spaced ports extending through said inner wall to said channel and arranged along the length of said inner wall with said ports along said straight line portion of said apertured wall having a given cross section and said ports along said curved line portion of said apertured wall having different cross section.

8. The apparatus as in claim 7 wherein said ports arranged along the length of said curved line portion have a cross section greater than said given cross section along any convexly curved line portion of said apertured inner wall and have a cross section less than said given cross section along any concavely curved line portion of said apertured inner wall.

9. The apparatus as in claim 8 wherein said ports are spaced generally equidistant from adjacent ports.

10. The apparatus as in claim 3 wherein said apertured wall includes a continuous slot extending through said inner wall to said channel and along the entire circumference of said apertured inner wall, said continuous slot having a given width along said straight line portion of said inner wall and a different width along said curved line portion of said inner wall.

11. The apparatus as in claim 10 wherein said continuous slot arranged along the length of said curved line portion has a width greater than said given width along any concavely curved line portion of said inner wall and a width lesser than said given width along any convexly curved line portion of said inner wall.

12. The apparatus as in claim 11 wherein said slot has an essentially uniform height.

13. The apparatus as in claim 3 wherein said apertured wall includes a continuous slot extending through said inner wall to said channel and along the entire circumference of said aperture wall, said slot having a given height along said straight line portion of said inner wall and a different height along said curved line portion of said apertured inner wall.

14. The apparatus as in claim 13 wherein said continuous slot arranged along the length of said curved line portion has a height less than said given height along any concavely curved line portion of said apertured inner wall and a height greater than said given height along any convexly curved line portion of said apertured inner wall.

15. The apparatus as in claim 14 wherein said slot has an essentially uniform width.

16. A method of flame seaming a glass sheet having a rough cut edge of irregular outline having a straight edge portion and a curved edge portion, comprising;
supporting said glass sheet to align central portions of said edge with an apertured inner wall of a ring-type burner having an irregular outline conforming to that of said glass sheet;
supplying fuel gas to said apertured inner wall for delivery as a burning gas to said central portions to form a substantially continuous thin sheet of flame at least as long as said rough edge, which impinges against said central portions, and
equalizing the heat flux per unit length delivered by said burner along said irregular outline of said glass sheet.

17. The method as in claim 16, wherein relative orbital motion between said glass sheet and said burner is provided during said flame seaming.

18. The method a s in claim 16 further including the step of aligning a straight line portion of said inner wall with a corresponding straight edge portion of said glass sheet and a curved line portion of said inner wall with a corresponding curved edge portion of said glass sheet and said equalizing step includes supplying said fuel gas to said apertured inner wall at a given rate per unit length of wall along said straight line portion of said apertured inner wall and at a different rate per unit length of wall along said curved line portion of said apertured inner wall, the difference in rates per unit length of wall along said portions being such as to provide a more nearly equal rate of flow per unit length of wall to said straight edge portion and to said curved edge portion of said glass sheet outline than if the rates of flow per unit length of wall to said straight lien portion and said curved line portion of said inner apertured wall were equal.

19. The method as in claim 18 wherein said equalizing step includes supplying said fuel gas mixture along a fuel supply passage of said burner for delivery through a plurality of ports spaced along said apertured inner wall and spacing said ports at a given concentration of ports per unit length of wall along said straight lien portion of said apertured inner wall and at different concentration of ports per unit length of wall along said curved line portion of said apertured inner wall.

20. A method as in claim 19 wherein said ports arranged along the length of said curved line portion are spaced at a concentration of ports per unit length of wall less than said given concentration along any concavely curved line portion of said apertured wall and at a concentration grater than said given concentration along any convexly curved line portion of said apertured wall.

21. The method as in claim 20 wherein each of said ports are of the same cross section.

22. The method as in claim 18 wherein said equalizing step includes supplying said fuel gas mixture along a fuel supply passage of said burner for delivery through a plurality of ports spaced along said apertured inner wall and said ports having a given cross section along said straight line portion of said apertured inner wall and a different cross section along said curved line portion of said apertured inner wall.

23. The method as in claim 22 wherein said ports have a port cross section greater than said given cross section along any convexly curved line portion of said apertured inner wall and a port cross section less than said given cross section along any concavely curved line portion of said apertured inner wall.

24. The method as in claim 23 wherein said ports are generally spaced apart equidistantly.

25. The method as in claim 18 wherein said equalizing step includes supplying said fuel gas mixture along a fuel supply passage of said burner for delivery through a circumferentially extending slot connecting said supply passage to said apertured inner wall, said continuous slot having a given width along said straight line portion of said apertured inner wall and a different width along said curved line portion of said apertured inner wall.

26. The method as in claim 25 wherein the width of said slot is greater than said given width along any concavely curved line portion of said apertured wall and the width of said slot is less than said given width along any convexly curved line portion of said apertured wall.

27. The method as in claim 26 wherein said slot has a generally uniform height.

28. The method as in claim 18 wherein said equalizing step includes supplying said fuel gas mixture along a fuel supply passage of said burner for delivery through a circumferentially extending slot connecting said supply passage to said apertured wall, said slot having a given height along said straight line portion of said apertured inner wall and a different height along said curved line portion of said apertured inner wall.

29. The method as in claim 28 wherein the height of said slot is less than said given height along any concavely curved line portion of said apertured wall and the height of said slot is greater than said given height along any convexly curved line portion of said apertured wall.

30. The method as in claim 29 wherein said slot has a generally uniform width.

* * * * *

UNITED STATES PATENT AND TRADEMARK OFFICE
CERTIFICATE OF CORRECTION

PATENT NO. : 5,041,151
DATED : August 20, 1991
INVENTOR(S) : Jack A. Bricker and Earl L. May It is certified that error appears in the above-identified patent and that said Letters Patent is hereby corrected as shown below:

Col. 8, Claim 1, line 4, "aperture" should be --apertured--.

Col. 8, Claim 7, line 8, before "different" insert --a--.

Col. 9, Claim 13, line 4, "aperture" should be --apertured--.

Col. 9, Claim 18, line 1, "a sin" should be --as in--; and line 16, "lien" should be --line--.

Col. 10, Claim 19, line 6, "lien" should be --line--.

Signed and Sealed this

Twenty-second Day of December, 1992

Attest:

DOUGLAS B. COMER

*Attesting Officer*    *Acting Commissioner of Patents and Trademarks*